United States Patent
Nagel et al.

(10) Patent No.: US 8,400,622 B2
(45) Date of Patent: Mar. 19, 2013

(54) ENHANCED OTDR SENSITIVITY BY UTILIZING MODE-FIELD DIAMETER MEASUREMENTS

(75) Inventors: Jonathan Nagel, Brooklyn, NY (US); Sheryl Woodward, Holmdel, NJ (US)

(73) Assignee: AT & T Intellectual Property I, LP, Atlanta, GA (US)

( * ) Notice: Subject to any disclaimer, the term of this patent is extended or adjusted under 35 U.S.C. 154(b) by 432 days.

(21) Appl. No.: 12/640,405

(22) Filed: Dec. 17, 2009

(65) Prior Publication Data

US 2011/0149270 A1      Jun. 23, 2011

(51) Int. Cl.
*G01N 21/00* (2006.01)
(52) U.S. Cl. ...................................... 356/73.1
(58) Field of Classification Search ............... 356/73.1
See application file for complete search history.

(56) References Cited

U.S. PATENT DOCUMENTS

2009/0027656 A1 *   1/2009   Zhang et al. .................. 356/73

OTHER PUBLICATIONS

Hartog, et al., "On the Theory of Backscattering in Single-Mode Optical Fibers", Journal of LightWave Technology, vol. LT-2, No. 2, Apr. 1984, pp. 76-82.
Nakazawa et al., "Measurement and Analysis on Polarization Properties of Backward Rayleigh Scattering for Single-Mode Optical Fibers", IEEE Journal of Quantum Electronics. vol. QE-17, No. 12, Dec. 1981, pp. 2326-2334.
Gold et al. "Determination of Structural Parameter Variations in Single-Mode Optical Fibres by Time-Domain Reflectometry", Electronic Letters, Jun. 10, 1982, vol. 18, No. 12, pp. 489-490.
Luna Technologies, Luna OFDR Data Sheet, Optical Frequency Domain Reflectometer, pp. 1-12, Rev. Jul. 2004.

* cited by examiner

*Primary Examiner* — Tara S Pajoohi Gomez
(74) *Attorney, Agent, or Firm* — Fay Kaplun & Marcin, LLP

(57) ABSTRACT

Described herein are systems and methods for enhancing sensitivity of an optical time-domain reflectometer ("OTDR") using bi-directional analysis techniques. One embodiment of the disclosure of this application is related to a computer readable storage medium including a set of instructions that are executable by a processor. The set of instructions being operable to collect a first set of measurement data at a first resolution to provide a relative backscatter of the fiber, collect a second set of measurement data taken at a second resolution to calculate loss along the length of fiber, and combine the first set of measurement data with the second set of measurement data to calculate the loss along the fiber at the first resolution.

18 Claims, 6 Drawing Sheets

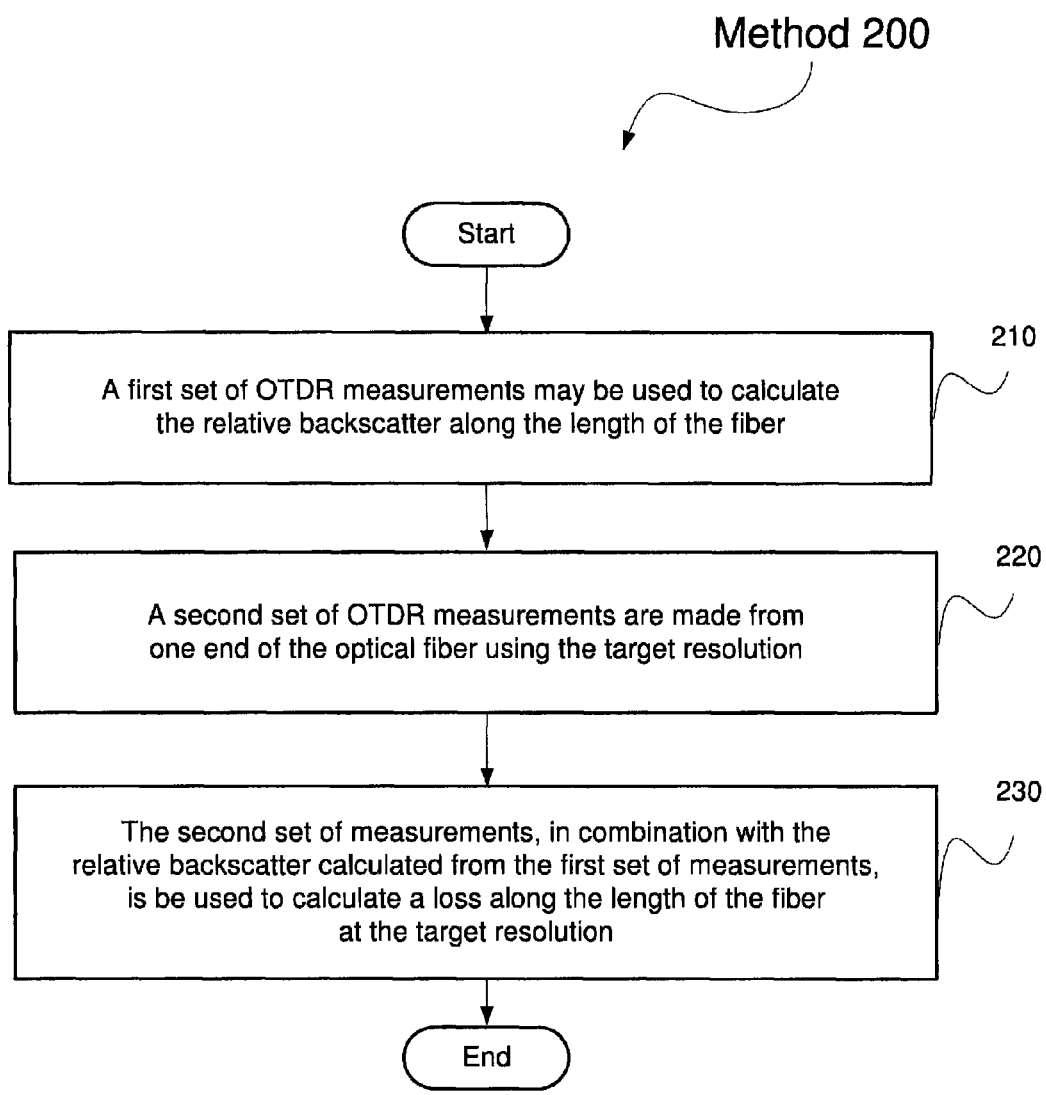

FIG. 3a  Graph 301
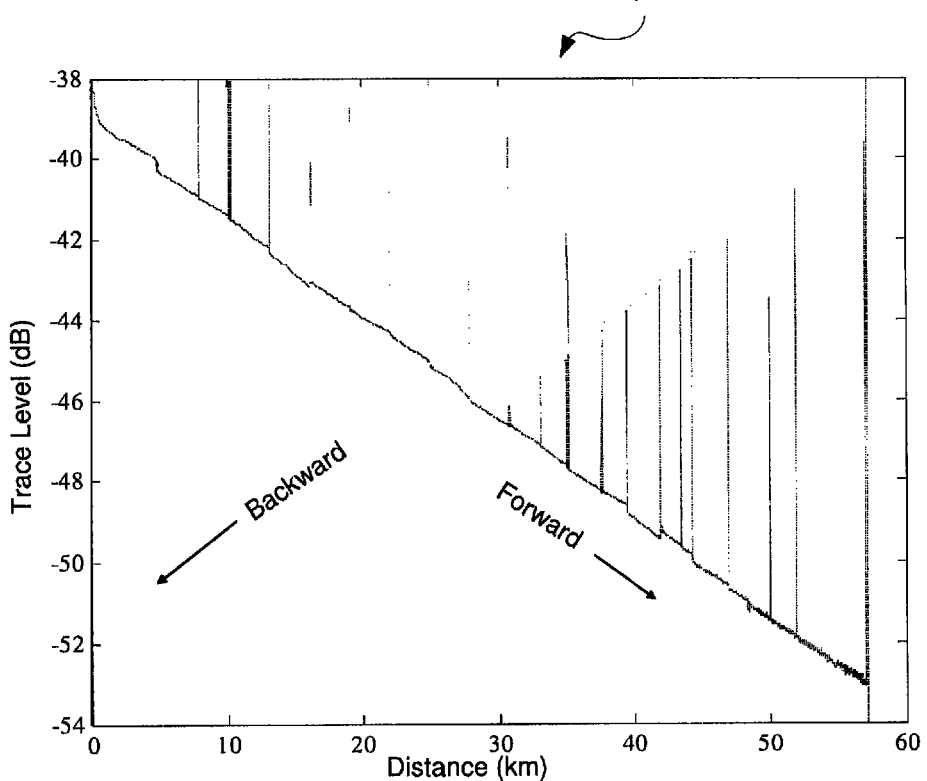
FIG. 3b  Graph 302
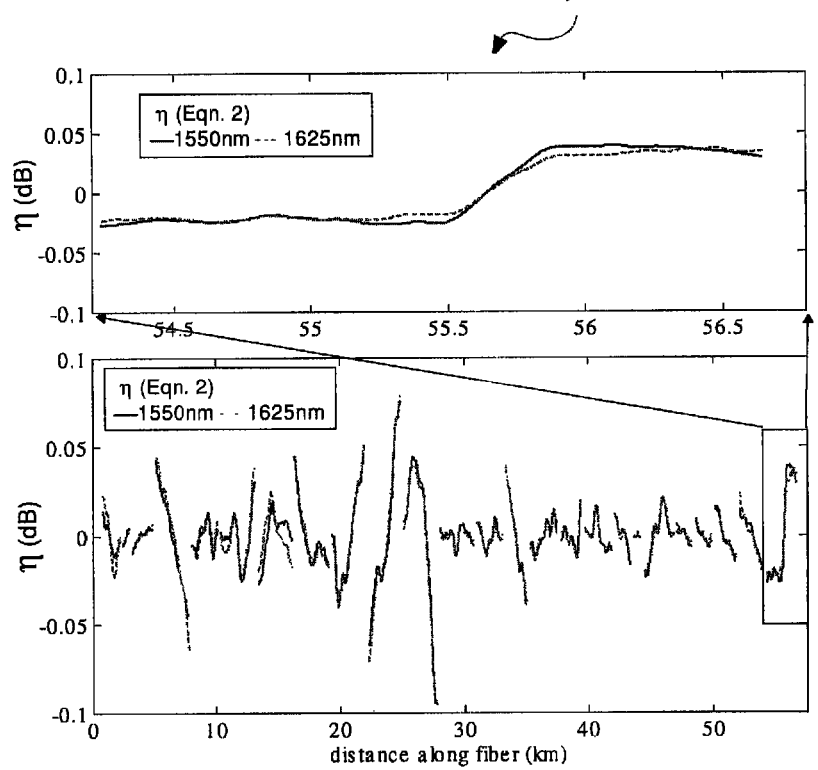

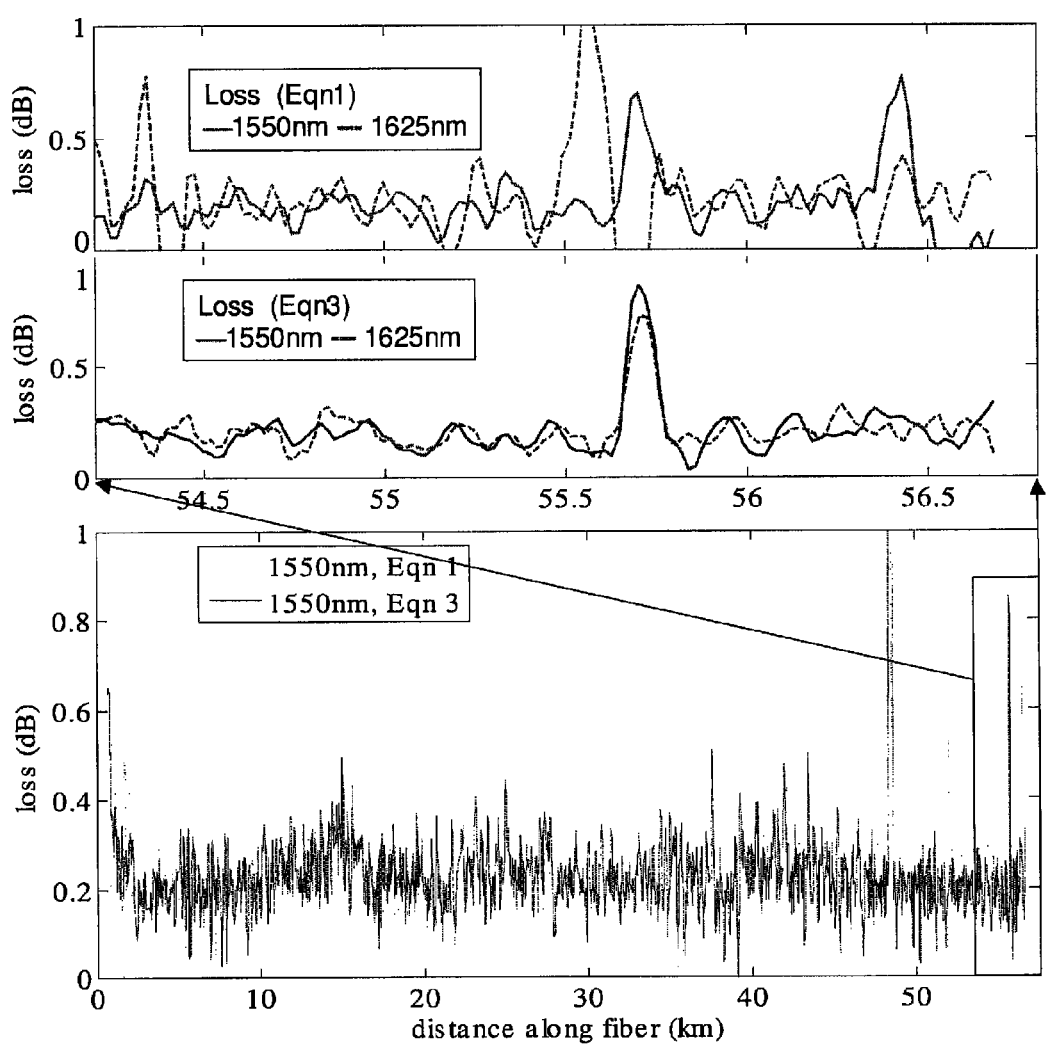
FIG. 3c Graph 303

FIG. 4a  Graph 401
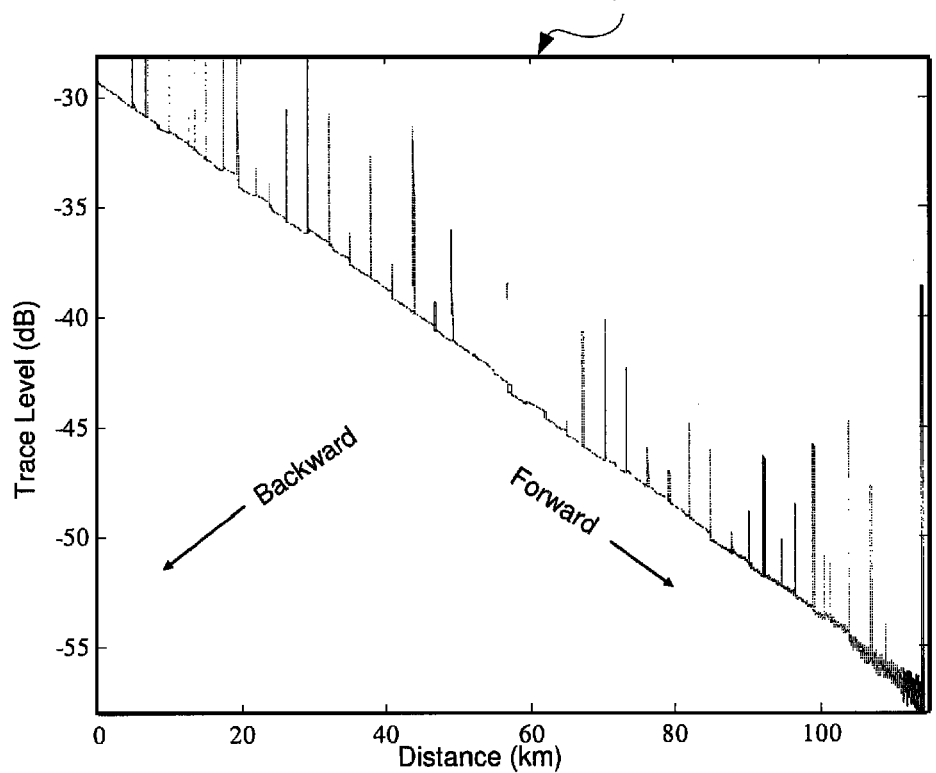
FIG. 4b  Graph 402
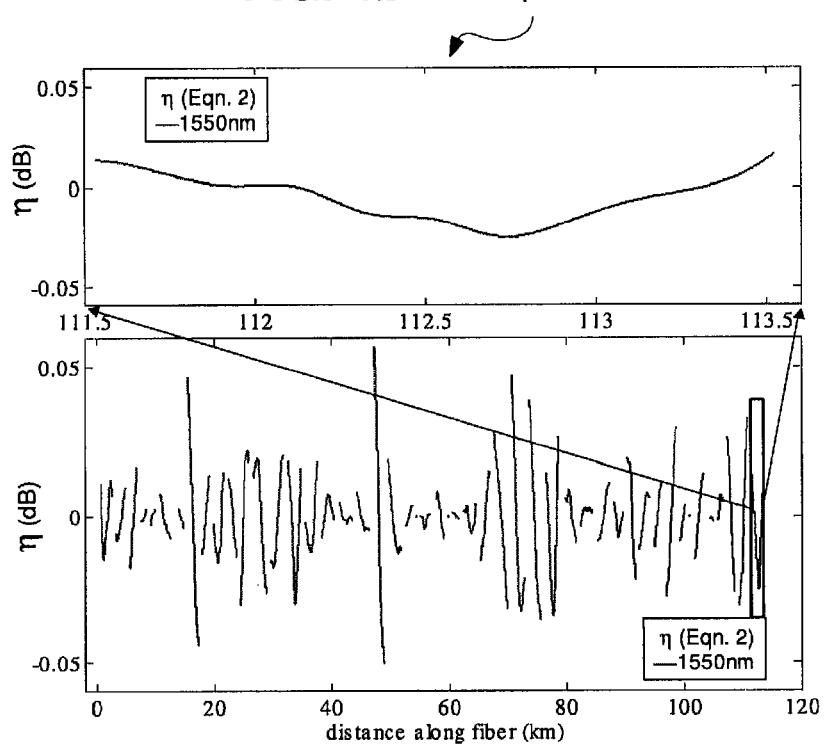

FIG. 4c Graph 403
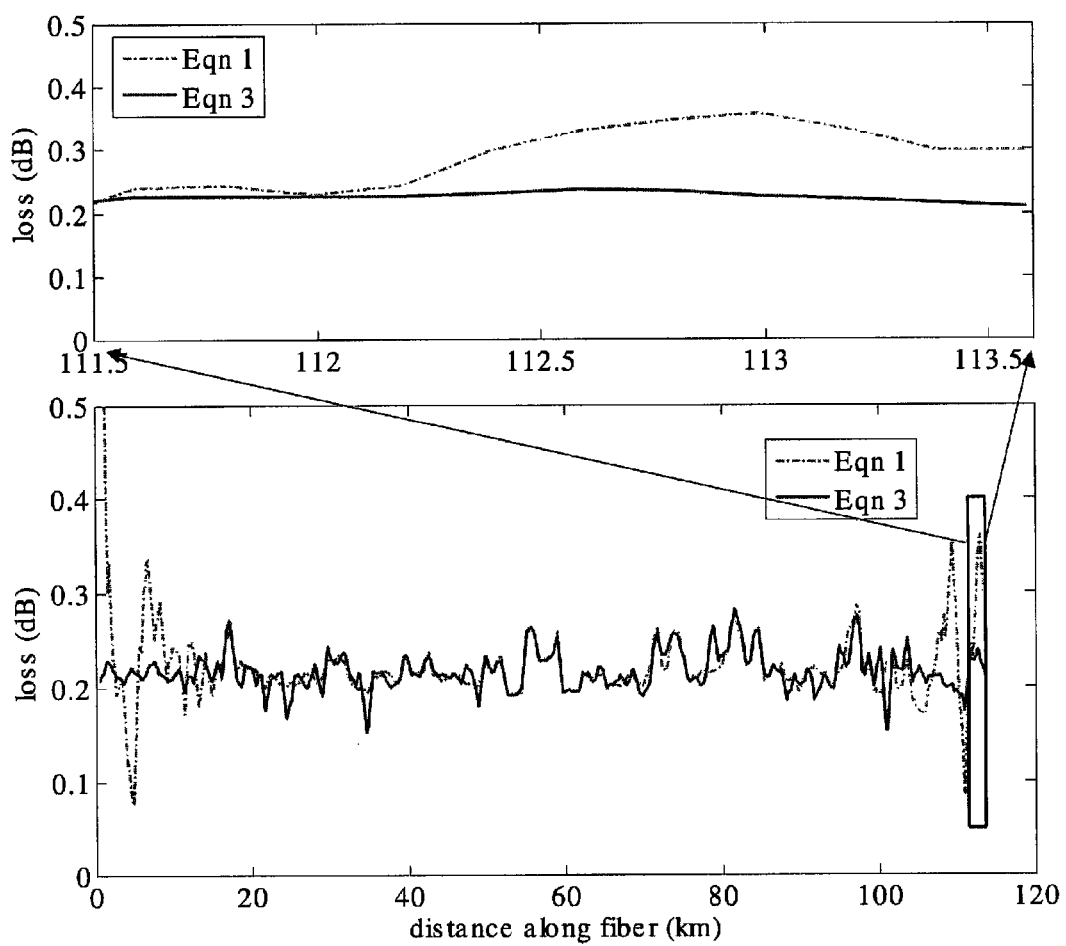

ENHANCED OTDR SENSITIVITY BY UTILIZING MODE-FIELD DIAMETER MEASUREMENTS

BACKGROUND

An optical time-domain reflectometer ("OTDR") is an opto-electronic instrument used to characterize an optical fiber. A typical OTDR injects a series of optical pulses into the fiber during a testing process. From the same end of the fiber, the OTDR also extracts light that is scattered and reflected back from points in the fiber due to irregularities in the optical fiber structure. This process is equivalent to the manner in which an electronic time-domain reflectometer may measure reflections caused by changes in the impedance of the cable under test. Accordingly, the strength of the back-reflected light is measured as a function of time, and is plotted as a function of fiber length.

OTDRs have conventionally been standard equipment for the characterization of optical fiber. Specifically, it is well known that by transmitting a pulse down a fiber and analyzing the back-reflected light, the loss of the fiber may then be characterized. OTDRs may characterize the loss and length of an examined fiber during manufacture, during warehousing, during installation, and during splicing. OTDRs are also used in measuring optical return loss in the fiber, as well as locating faults in the fiber, such as breaks. Faults or failures in the fiber may be costly, in terms of repairing the fiber, as well as any adverse affects in service (e.g., disruption or loss of service). Any improvements in OTDRs have conventionally required the use of more sensitivity and more expensive devices and components. Specifically, improvements in sensitivity are typically achieved through launching more light into a test fiber and using more sensitive detectors within the OTDR.

SUMMARY OF THE INVENTION

Described herein are systems and methods for enhancing sensitivity of an optical time-domain reflectometer ("OTDR") using bi-directional analysis techniques. One embodiment of the disclosure of this application is related to a computer readable storage medium including a set of instructions that are executable by a processor. The set of instructions being operable to collect a first set of measurement data at a first resolution to provide a relative backscatter of the fiber, collect a second set of measurement data taken at a second resolution to calculate loss along the length of fiber, and combine the first set of measurement data with the second set of measurement data to calculate the loss along the fiber at the second resolution.

A further embodiment of the disclosure of this application is related to a system comprising at least one detector collecting a first set of measurement data at a first resolution to provide the relative backscatter of the fiber and collecting a second set of measurement data at a second resolution. The system further comprising a processor combining the first set of measurement data with the second set of measurement data to calculate the loss along the fiber at the second resolution.

BRIEF DESCRIPTION OF THE DRAWINGS

FIG. 2 shows an exemplary method for enhancing sensitivity of an OTDR using bi-directional analysis techniques according to an exemplary embodiment.

FIG. 3A shows a graph of measurements of the back-reflected light as a function of distance, L(x), for a fiber according to the exemplary embodiments described herein.

FIG. 3B shows a graph of the relative backscatter function, $\eta(x)$, for the same fiber, calculated from data using longer pulses than the data shown in FIG. 3A.

FIG. 3C shows a graph depicting the local loss calculated according to the standard bi-directional calculation and the MFD-enhanced calculation described herein.

FIGS. 4A-4C illustrate the enhancing of the range of the OTDR 150 according to the embodiments described herein.

DETAILED DESCRIPTION

Figure 1:
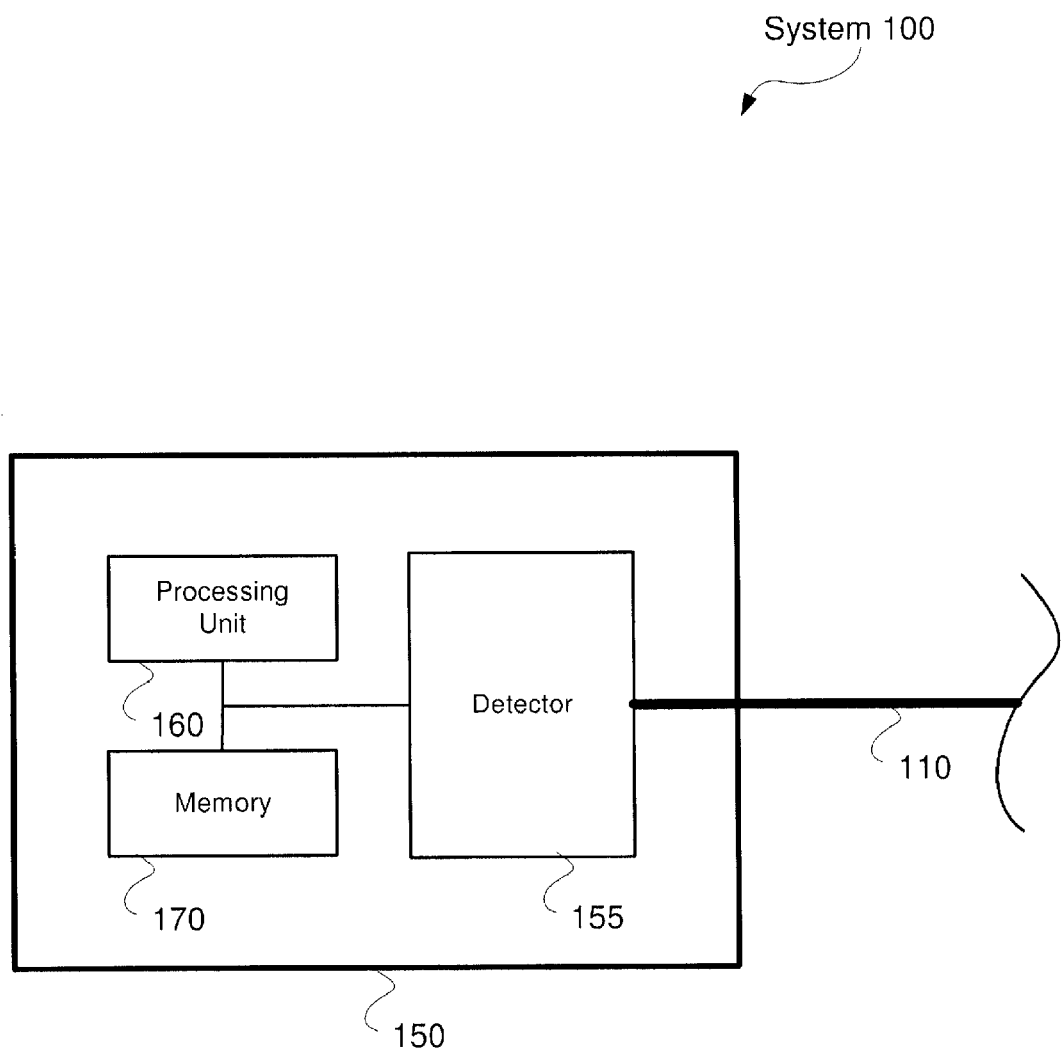
FIG. 1 shows an exemplary system for enhancing sensitivity of an OTDR using bi-directional analysis techniques according to an exemplary embodiment.

The exemplary embodiments disclosure may be further understood with reference to the following description and the related appended drawings, wherein like elements are provided with the same reference numerals. The exemplary embodiments are related to systems and methods for enhancing sensitivity of an optical time-domain reflectometer ("OTDR") using bi-directional analysis techniques. For instance, the exemplary embodiments are related to systems and methods for providing measurements of cabled fiber where fluctuations in a local mode field diameter may be due to factory variations. The systems and methods described herein may achieve improved sensitivity of an OTDR instrument by optimizing the analysis of the measurable data, without requiring any improvements or additional components within the underlying hardware of the OTDR instrument.

It should be noted that an exemplary OTDR may be used for estimating a fiber's length and overall attenuation, including splice losses and connector losses. From a single OTDR trace, a user may see the level of back-reflected light as a function of distance down a fiber. The signal level is a function of both the fiber loss and the mode-field diameter of the fiber ("MFD"). It should be noted that within the field of fiber optics, a MFD reading may be defined as an expression of distribution of the irradiance, or the optical power per unit area, across an end face of a tested fiber.

In order to accurately characterize splice-loss using this technique, traces are taken from each end of an optical fiber using a bi-directional analysis. Specifically, bi-directional traces may more accurately calculate the loss and relative backscatter function along the length of the fiber than what is calculated using a single trace. The relative backscatter function is a function of various characteristics of a fiber such as, but not limited to, the fiber's mode field diameter, doping concentration, Rayleigh scatter coefficient, core diameter, etc. The dominant cause of variation in the relative backscatter function is due to variations in the mode-field diameter. Bi-directional analyses may also be used to characterize local variations in both the structure and loss along the length of the fiber.

By differentiating a difference between a forward trace down a fiber and a backward trace down the same fiber, the loss along the fiber length may be calculated using the following equation:

$$L(x) = \partial/\partial x (10 \cdot \log_{10} T_{back} - 10 \cdot \log_{10} T_{forward})/2$$

According to this equation, L(x) may be the loss as a function of distance along the fiber in units of dB/km, while $T_{forward}$ may be the forward OTDR trace and $T_{backward}$ may be the backward OTDR trace, in linear units. The local loss L(x) may be useful for locating and identifying problems with the installed fiber 110. It should be noted that the two traces $T_{back}$ and $T_{forward}$ vary along the length of the fiber, and in the above equation the measurements must be aligned, so that the measurements $T_{back}$ and $T_{forward}$ correspond to the same points along the axis to insure accurate results.

The error in L(x) will increase as the noise in the data increase (i.e., as the data becomes more noisy). Specifically, the total energy launched into the fiber 110 will decrease as the pulsewidth decreases. Accordingly, finer resolution traces may result in greater noise in the traces. Furthermore, the OTDR traces may have a lower SNR for the portions of the traces when the roundtrip distance for the light to travel during a trace is at its greatest. Therefore, $T_{back}$ is noisier as x approaches zero (e.g., noisiest when x=0), and $T_{forward}$ is noisier as x approaches L (e.g., noisiest when x=L). As a result, L(x) may not be as well determined near the ends of the fiber 110 (e.g., x=0 and x=L) as it is near the center of the fiber 110.

Bidirectional traces may also be analyzed to provide information regarding the variation in the fiber structure. The relative backscatter is a function of various characteristics of the fiber, such as, but not limited to, the fiber's numerical aperture, doping concentration, Rayleigh scatter coefficient, core diameter, etc. The relative backscatter function can be calculated from the traces using the following equation:

$$\eta(x) = (10 \cdot \log_{10} T_{back} + 10 \cdot \log_{10} T_{forward})/2$$

It should be noted that the relative backscatter function may be related to the usual backscatter function by an additive constant. For cabled fiber that was part of a single draw, the variations in $\eta$ as a function of distance may be caused largely by variations in MFD, which may determine the numerical aperture.

The accuracy of any bi-directional analysis may be limited by the sensitivity of the OTDR. Any inaccuracies may be most noticeable at either end of the tested fiber, wherein one of the two traces will have a poor signal-to-noise ratio ("SNR") due to the small amount of back-reflected light reaching a detector of the OTDR. As will be described in detail below, the usefulness of bi-directional analysis of local loss in a fiber will depend on the resolution of the measurement, and especially on the SNR of the traces.

According to the exemplary embodiments described herein, the effective range for local loss analysis on a standard OTDR may be doubled by taking bi-directional traces of the fiber at both a target resolution and also at a lower resolution. Mode field diameter ("MFD") variations in loose-tube cabled fiber typically have a length scale much longer than the resolution of interest. Therefore, the relative backscatter function may be measured using less noisy, lower-resolution OTDR traces. The exemplary embodiments of the described systems and methods can use the low-noise relative backscatter function measurements to aid in bi-directional analysis of the noisier, higher-resolution OTDR traces of interest.

It should be noted that for a cabled fiber that was part of a single draw, $\eta$ varies slowly along the length of a fiber. The slow variation $\eta$ in may be exploited to enhance calculation of loss along a fiber, as well as to extend the range of the OTDR at a given resolution.

It is important to note that the relative backscatter information may be considered consistent over time. Therefore, once the relative backscatter of a fiber is measured, the measurement data may be used during any subsequent analyses of the fiber.

As noted above, a single OTDR trace may provide a user with a level of back-reflected light as a function of distance down a fiber. Specifically, the signal level may be a function of both the MFD of the fiber and the fiber loss. By measuring bi-directional traces (e.g., traces originating at each end of the fiber) the effect of the varying MFD may be eliminated, and the loss along the length of the fiber may then be calculated.

FIG. 1 shows an exemplary system 100 for enhancing sensitivity of an OTDR using bi-directional analysis techniques according to an exemplary embodiment. The exemplary system 100 may include an OTDR 150 having a detector 155 in communication with a processing unit 160 (e.g., a processor, multiprocessor, CPU, etc.) and a centralized data location or computer-readable storage medium, such as a memory 170. In addition to the detector 155, the OTDR 150 may include a light source (e.g., a semiconductor laser), a coupler, and/or a circulator. It should be noted that the processing unit 160 may perform a set of instructions related to the systems and methods described herein. Furthermore, the processing unit 160 may be in communication with the memory 170. Accordingly, each of the OTDR 150, the processing unit 160, and the memory 170 may be composed of various computer hardware or software components, or any combination thereof.

As will be described below, the processing unit 160 may enhance the sensitivity of the OTDR 150 and its detector 150 by a taking a small amount of additional data (e.g., relative backscatter readings) and optimizing the analysis of this data. It should be noted that each of the processing unit 160 and the memory 170 may reside within the OTDR 150, itself. Alternatively, these components may reside in separate devices in communication with the OTDR 150. Furthermore, it should be noted that the system 100 is not limited to a particular set of components, and may include any number of components, either more or less than those illustrated in FIG. 1.

As noted above, the exemplary embodiments of the system 100 may improve the sensitivity of an optical time domain reflectometer, such as OTDR 150. These improvements may be accomplished without requiring any improvements or changes to the underlying hardware of the OTDR 150. Specifically, as will be described in greater detail below, two sets of bi-directional measurements may be taken of an exemplary fiber 110 (e.g., fiber under test) to improve the sensitivity of the OTDR 150 while optimizing the analysis of all measured data related to the fiber 110.

FIG. 2 shows an exemplary method 200 for enhancing sensitivity of the OTDR 150 using bi-directional analysis techniques on the exemplary fiber 110 according to the embodiments described herein.

In step 210 of the method 200, a first set of OTDR measurements may be collected and used to calculate the relative backscatter along the length of the fiber 110. It should be noted that the term collect may refer to retrieving measurement data from a current OTDR trace, or retrieving measurement data from the memory 170. For example, the memory 170 may store measurement data from a previous OTDR trace.

Due to the fact the MFD, and hence the relative backscatter, may vary slowly along the length of the fiber 110, this first set of measurement data may be made at a lower resolution than may be desirable when characterizing the loss along the fiber length. By using a lower resolution, a longer optical pulse may be used, thereby increasing the optical power launched. Accordingly, the SNR of the OTDR 150 is improved.

In a first embodiment of the invention, in step 220 of the method 200, a second set of OTDR measurements are made from one end of the optical fiber 110 using the target resolution.

In step 230, the second set of measurements, in combination with the relative backscatter calculated from the first set of measurements may be used to calculate a loss along the length of the fiber 110 at the target resolution.

$$L(x) = \partial/\partial x (10 \cdot \log_{10} T_{calculated} - 10 \cdot \log_{10} T_{forward})/2$$

where
T$_{forward}$ are the results of the measurements made in step 220.
and $$T_{calculated} = 10^{\wedge}((2\eta(x) - 10 \cdot \log_{10} T_{forward})/10)$$

It should be noted that due to the fact that the backscatter function may be considered consistent over time, steps 220 and 230 may be performed at any period of time, such as, for example, a time long after the performance of step 210.

As described above, the exemplary embodiment of the systems and methods allow for accurately calculating fiber loss using a single OTDR trace. Additional advantages include achieving accurate loss information over longer spans of fiber. For instance, MFD information may be used to characterize two fiber spans. If these two fiber spans are joined together in order to form a longer single fiber span, then the MFD information may be used to calculate loss information on this single fiber span. Furthermore, this longer span may even be at a distance that is greater than what the OTDR 150 would otherwise be capable of characterizing. The SNR of the OTDR traces taken at the target resolution may not be sufficient to accurately calculate the loss along the entire length of fiber 110.

FIG. 3A shows a graph 301 of measurements of the back-reflected light as a function of distance, L(x), for the fiber 110 according to the exemplary embodiments described herein. Specifically, FIG. 3A shows polarization-scrambled, bi-directional traces taken with 100 ns pulses, 20 m resolution and 1 minute averaging time (e.g., acquisition time). As depicted in FIG. 3A, the function is noisier near then ends of each trace. The polarization scrambling may be necessary for high resolution (e.g., 20 m or less) to compensate for polarization interference effects of the order of the beat length, such as 10 m-20 m in this scenario.

FIG. 3B shows a graph 302 of the relative backscatter function, η(x), for the same fiber 110, calculated from data using longer pulses than the data shown in FIG. 3A. Specifically, FIG. 3B shows η(x) calculated from OTDR traces that were taken with lower-noise 275 ns pulses, 60 m resolution and 1 minute averaging time (e.g., acquisition time). The upper curve is a close-up of the final segment of the span.

The relative backscatter function, η(x), measured at the lower resolution of 60 m in FIG. 3B may be used to enhance the higher resolution data shown in FIG. 3A in order to calculate the loss along the fiber 110. To accomplish this, the SNR data may be optimized at several points along the fiber 110. Specifically, an appropriate combination of data from each of the two high resolution traces T$_{back}$ and T$_{forward}$ along with the determination of η(x) from the lower resolution measurement may be used as such:

$$L(x) = (\partial/\partial x)(\kappa(x)) \cdot (\eta - 10 \cdot \log_{10} T_{forward}) - (\partial/\partial x)(1 - \kappa(x)) \cdot (\eta - 10 \cdot \log_{10} T_{back})$$

According to the equation above, κ(x) may be chosen to optimize the SNR of L(x). For example, when the OTDR 150 noise levels in both traces are similar, an adequate choice of κ(x) may be:

$$\kappa(x) = (T_{forward}(x))/(T_{forward}(x) + T_{back}(x))$$

FIG. 3C shows a graph 303 depicting the local loss calculated according to the standard bi-directional calculation and the MFD-enhanced calculation described herein. In FIG. 3C, the portion of the L(x) near an area of localized loss is shown in detail at both 1550 nm and 1625 nm to illustrate the effectiveness of the method. By comparing the results of both wavelengths, it is easier to determine which loss variations are actual losses and which loss variations are the results from OTDR noise. For example, a fusion splice loss at 55.7 km may be missed using standard bi-directional analysis while this loss was seen using MFD-enhanced analysis.

FIGS. 4A-4C illustrate the enhancing of the range of the OTDR 150 according to the embodiments described herein. According to the example depicted in FIGS. 4A-4C, bi-directional OTDR traces were taken on a 114 km length of installed fiber formed by concatenating two 57 km fibers. Traces were taken using two different resolution settings. Specifically, a lower (e.g., coarser) resolution was used (e.g., 200 m) using 1000 ns pulsewidth with a 1 hour averaging time, and a higher (e.g., finer) resolution was used (e.g., 60 m) using a 275 ns pulsewidth with a 5 minute averaging time.

FIG. 4A shows a graph 401 of the higher resolution (60 m) traces and exhibits evidence of noise at the end points of the fiber. FIG. 4B shows a graph 402 of the relative backscatter function, η(x), determined from the lower resolution (200 m) traces. Finally, FIG. 4C shows a graph 403 of the resulting local lass L(x) as calculated from the standard bi-directional calculation and the MFD-enhanced calculation. FIG. 4C includes a close-up view of the last segment in the fiber. It should be noted that the error in the estimated loss using the standard bi-directional calculation is visible in FIG. 4C.

It will be apparent to those skilled in the art that various modifications may be made in the described embodiments, without departing from the spirit or the scope of the application. Thus, it is intended that the present disclosure covers modifications and variations of this application provided they come within the scope of the appended claimed and their equivalents.

What is claimed is:

1. A non-transitory computer readable storage medium including a set of instructions that are executable by a processor, the set of instructions, when executed by the processor, causing the processor to perform a method, comprising:
    collecting a first set of measurement data at a first resolution for a fiber, wherein the first set of measurement data comprises optical time-domain reflectometer traces T$_{back}$ and T$_{forward}$;
    calculating a relative backscatter of the fiber based on the first set of measurement data based on a relative backscatter function η(x)=(10·log$_{10}$T$_{back}$+10·log$_{10}$T$_{forward}$)/2;
    collecting a second set of measurement data taken at a second resolution;
    calculating a loss along a length of the fiber based on the second set of measurement data; and
    combining the first set of measurement data with the second set of measurement data to calculate the loss along the fiber at the first resolution.

2. The non-transitory computer readable storage medium according to claim 1, wherein the loss is calculated at the second resolution.

3. The non-transitory computer readable storage medium according to claim 1, wherein the first resolution is a lower resolution than the second resolution.

4. The non-transitory computer readable storage medium according to claim 1, wherein the collecting of the first and second sets of measurement data is performed by an optical time-domain reflectometer.

5. The non-transitory computer readable storage medium according to claim 1, wherein the collecting of the first measurement data includes bi-directional traces along the length of the optical fiber.

6. The non-transitory computer readable storage medium according to claim 1, wherein the collecting of the second measurement data includes a uni-directional optical time-domain reflectometer trace along the length of the optical fiber.

7. The non-transitory computer readable storage medium according to claim 1, wherein the first set of measurement data includes the relative backscatter data.

8. The non-transitory computer readable storage medium according to claim 1, wherein the first set of measurement data includes bi-directional optical time-domain reflectometer traces.

9. The non-transitory computer readable storage medium according to claim 1, wherein the second set of measurements is an optical time-domain reflectometer trace $T_2$ and wherein the loss is:

$$L(x)=\partial/\partial x(10 \cdot \log_{10} T_{calculated} - 10 \cdot \log_{10} T_2)/2,$$

wherein $$T_{calculated}=10^{\wedge}((2\eta(x)-10 \cdot \log_{10} T_2)/10).$$

10. The non-transitory computer readable storage medium according to claim 9, wherein the second set of measurements includes bi-directional optical time-domain reflectometer traces $T_{2forward}$ and $T_{2back}$, wherein the loss is:

$$L(x)=(\partial/\partial x)(\kappa(x)) \cdot (\eta - 10 \cdot \log_{10} T_{2forward}) - (\partial/\partial x)(1-\kappa(x)) \cdot (\eta - 10 \cdot \log_{10} T_{2back}).$$

11. The non-transitory computer readable storage medium according to claim 10, wherein $\kappa(x)=(T_{2forward}(x))/(T_{2forward}(x)+T_{2back}(x))$.

12. A system, comprising:
a detector collecting a first set of measurement data at a first resolution for of a fiber, the first set of measurement data comprising optical time-domain reflectometer traces $T_{back}$ and $T_{forward}$, the detector further collecting a second set of measurement data taken at a second resolution for the fiber; and
a processor calculating a relative backscatter of the fiber based on the first set of measurement data based on a relative backscatter function $\eta(x)=(10 \cdot \log_{10} T_{back} + 10 \cdot \log_{10} T_{forward})/2$, the processor further combining the first set of measurement data with the second set of measurement data to calculate the loss along the fiber at the first resolution.

13. The system according to claim 12, wherein the loss is calculated at the second resolution.

14. The system according to claim 12, wherein the first resolution is a lower resolution then the second resolution.

15. The system according to claim 12, wherein the one detector collecting of the first and second sets of measurement data is a component of an optical time-domain reflectometer.

16. The system according to claim 12, wherein the collecting of the first set of measurement data includes bi-directional traces along the length of the optical fiber.

17. The system according to claim 12, wherein the collecting of the second measurement data includes a uni-directional optical time-domain reflectometer trace along the length of the optical fiber.

18. The system according to claim 12, wherein the second set of measurements is an optical time-domain reflectometer trace $T_2$ and wherein the loss is:

$$L(x)=\partial/\partial x(10 \cdot \log_{10} T_{calculated} - 10 \log_{10} T_2)/2,$$

wherein $T_{calculated}=10^{\wedge}((2\eta(x)-10 \log_{10} T_2)/10).$

* * * * *